United States Patent [19]

Wharton

[11] Patent Number: 4,521,146
[45] Date of Patent: Jun. 4, 1985

[54] LUG NUT CAP
[75] Inventor: Donald J. Wharton, Mishawaka, Ind.
[73] Assignee: Maron Products, Inc., Mishawaka, Ind.
[21] Appl. No.: 439,772
[22] Filed: Nov. 8, 1982
[51] Int. Cl.³ .............................................. F16B 41/00
[52] U.S. Cl. ......................................... 411/1; 411/8; 411/429; 411/910
[58] Field of Search ....................... 411/429, 1, 2, 3, 4, 411/5, 6, 7, 8, 910, 911, 374, 402, 403; 70/229, 231

[56] References Cited
U.S. PATENT DOCUMENTS

| | | | |
|---|---|---|---|
| 2,316,695 | 4/1943 | Jaffa | 411/910 X |
| 3,440,590 | 4/1969 | Post | 411/910 X |
| 3,492,841 | 2/1970 | Ipri | 411/910 X |
| 3,854,372 | 12/1974 | Gutshall | 411/1 |
| 3,865,007 | 2/1975 | Stanback | 411/2 |
| 4,037,515 | 7/1977 | Kesselman | 411/3 |
| 4,302,137 | 11/1981 | Hart | 411/432 |
| 4,324,516 | 4/1982 | Sain et al. | 411/910 X |

Primary Examiner—Gary L. Smith
Assistant Examiner—Adrian H. Whitcomb, Jr.
Attorney, Agent, or Firm—James D. Hall

[57] ABSTRACT

A fastener for the protection of vehicle wheels, including a skirt member which fits around the wheel lug nut and a retainer member which is threaded onto the exposed end of the lug and overlies a part of the skirt member. The retainer member is recessed into the skirt member and includes a socket part which strips upon tightening to prevent removal of the retainer member from the lug.

1 Claim, 4 Drawing Figures

LUG NUT CAP

SUMMARY OF THE INVENTION

This invention relates to a tamper resistant protective cap for a vehicle lug nut assembly.

One of the major problems with transporting vehicles is the theft or substitution of vehicle tires. Many attempts have been made in the past to rectify this problem with varying degrees of success. Some examples of prior art, tamper resistant fasteners, are disclosed in U.S. Pat. Nos. 1,447,564; 2,316,695; 3,492,841; 4,037,515; and 4,324,516.

The present invention provides for a two-piece protective cap which effectively encloses a lug nut, thereby reducing the possibility of the unauthorized removal of a vehicle tire. This assembly includes a protective skirt member which fits over the lug nut. A retainer member is threaded onto the exposed portion of the wheel lug, and into a recess formed in the skirt member, overlying the skirt member to prevents its removal from around the lug nut. The retainer member includes a socket part into which a tool is inserted to tighten the retainer member upon the lug. Upon full tightening of the retainer member onto the lug, the socket part of the retainer member is stripped by the tightening tool, making it impossible to unscrew the retainer member from the lug with the skirt member in place about the lug nut.

Accordingly, it is an object of this invention to provide for a protective lug nut cap which effectively reduces unauthorized wheel removal.

Another object of this invention is to provide a protective lug nut cap which can serve to provide visual identification of attempted wheel removal.

Another object of this invention is to provide a protective lug nut cap which is simple to install and economical.

Other objects of the invention will become apparent upon a reading of the following description.

BRIEF DESCRIPTION OF THE DRAWINGS

A preferred embodiment has been chosen to best explain the principles of the invention wherein.

DESCRIPTION OF THE PREFERRED EMBODIMENT

Figure 4:
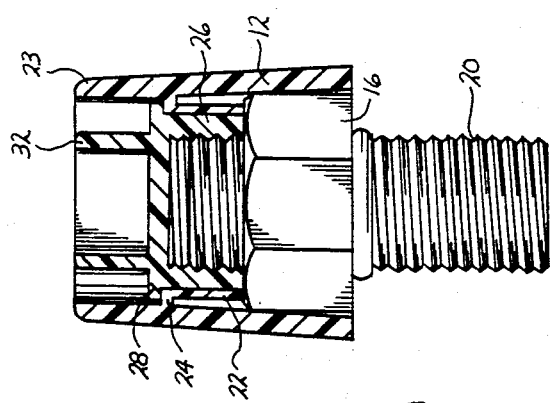
FIG. 4 is a cross-sectional view of the lug nut cap before the retainer member is fully tightened and stripped.
Figure 2:
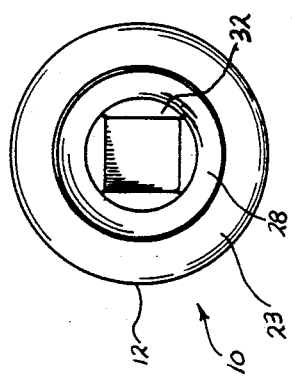
FIG. 2 is an end view of the lug nut cap with the retainer member in its pre-tightened position.

The preferred embodiment illustrated is not intended to be exhaustive or to limit the invention to the precise form disclosed. It is chosen and described to best explain the principles of the invention and their application and practical use to thereby enable others skilled in the art to utilize the invention.

The lug nut cap 10 of this invention includes a skirt member 12 and a retainer member 14. Skirt member 12 is adapted to be fitted about a lug nut 16 turned upon a threaded stud or lug 20 of a vehicular hub assembly 18. Lug 20 is threaded into an axle hub assembly (not shown) to which wheel 22 is attached.

Figure 3:
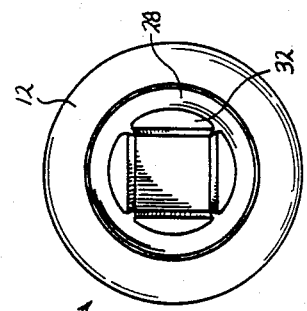
FIG. 3 is an end view of the lug nut cap with the retainer member in its stripped, tightened position.
Figure 1:
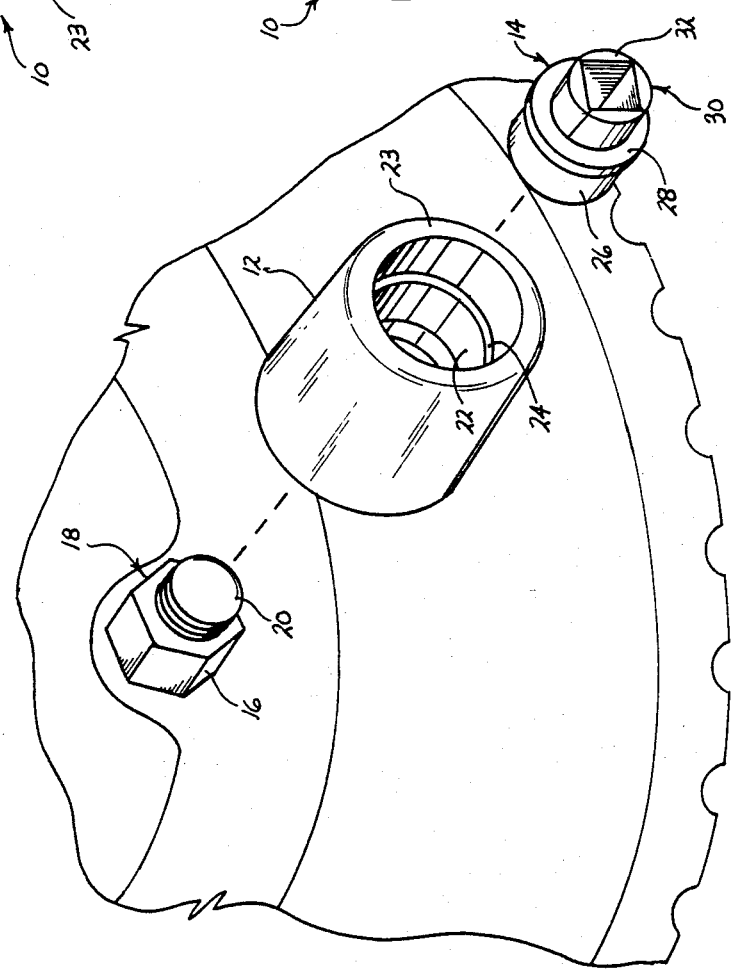
FIG. 1 is a perspective view of the lug nut cap of this invention.

Skirt member 12 includes an outer annular wall 22 and internal sleeve having a shoulder 24 which is recessed from the outer end 23 of the skirt member. Retainer member 14 includes an internally threaded lower part 26 and a socket part 30 separated by an annular flange 28. Flange 28 of retainer member 14 overlies skirt member shoulder 24 when the retainer member threaded part 26 is fully turned upon lug 20. Shoulder 24 is inset sufficiently from end 23 of the skirt member 12 to allow retainer member 14 to be fully received within the skirt member. Socket part 30 of retainer member 14 includes yieldable wall parts 32. Socket wall parts 32 may be separated longitudinally to facilitate outward stripping movement of the wall parts, as shown in FIG. 3, when the retainer member 14 is fully turned upon lug 20.

To utilize lug nut cap 10, skirt member 12 is placed about lug nut assembly 18. Retainer member 14 is threaded, by the insertion of a tool into its socket part 30, onto the exposed uupper portion of lug 20 until flange 28 of the retainer member is seated upon skirt member annular shoulder 24 or threaded lower part 26 is fully turned upon lug 20. At this time the tool is continued to be turned within retainer member socket part 30 causing its wall parts 32 to be bent outwardly into their stripped position shown in FIG. 3 with the tool rotating relative to the retainer member. Retainer member 14 cannot now be unthreaded from lug 20 due to its stripped and recessed position within skirt member 12, nor can the skirt member be pulled from about lug nut 16. To remove lug nut cap 10, it is necessary to cut away or shatter skirt member 12, such as by a hammer blow. Retainer member 14 is then accessible and can be removed from lug 20.

Skirt member 12 may include ribs or similar protrusions which extend along the inner surface of its wall 22 and which engage the sides of nut 16 to prevent rotation of the skirt member about the nut.

It is to be understood that the above description does not limit the invention to the above given details, but may be modified within the scope of the appended claims.

I claim:

1. A protective cap for a wheel nut when threaded upon a lug, said cap comprising a skirt member defined by an outer annular wall terminating in outer and inner end edges and having an opening formed therethrough between the end edges, said skirt member adapted to be placed about said nut with its said wall enclosing the nut and exposed end of the lug, said skirt member including an internal shoulder extending from said side wall into said opening, said skirt member shoulder being spaced from said outer end edge to form a recess about said exposed lug end, and a retainer member including socket means for receiving a tightening tool and a threaded portion adapted for engagement with said lug, said retainer member including a flange located between said socket means and said threaded portion, said retainer member flange adapted to adjacently overly said skirt member shoulder when said retainer member threaded part is turned onto said lug end with said skirt member placed about said nut, said retainer member socket means including a wall part adapted to be located within said retainer member recess when said retainer member threaded portion is turned onto said lug, and said socket means wall part being yieldable wherein said socket means is stripped when said retainer member is fully turned onto said lug end with said tool rotating relative to the wall part whereby the retainer member is prevented from being further turned or loosened by the tool, said socket means wall part including individual wall members separated by slit means for allowing said wall members to flex away from said tool upon final tightening of said socket means onto said lug end.

* * * * *